(12) United States Patent
Borkowski et al.

(10) Patent No.: US 11,086,504 B2
(45) Date of Patent: *Aug. 10, 2021

(54) SCROLL FOCUS

(71) Applicant: International Business Machines Corporation, Armonk, NY (US)

(72) Inventors: Pawel J. Borkowski, Cracow (PL); Michal Klak, Zielonki (PL); Maksymilian J. Kowalik, Cracow (PL); Bartlomiej T. Malecki, Slomniki (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/662,141

(22) Filed: Oct. 24, 2019

(65) Prior Publication Data
US 2020/0057542 A1 Feb. 20, 2020

Related U.S. Application Data

(63) Continuation of application No. 15/082,034, filed on Mar. 28, 2016, now Pat. No. 10,552,028, which is a
(Continued)

(30) Foreign Application Priority Data

Dec. 16, 2011 (EP) .................................... 11194006

(51) Int. Cl.
*G06F 3/00* (2006.01)
*G06F 3/0485* (2013.01)
(Continued)

(52) U.S. Cl.
CPC ............ *G06F 3/0485* (2013.01); *G06F 3/048* (2013.01); *G06F 3/0481* (2013.01); *G06F 3/04855* (2013.01)

(58) Field of Classification Search
CPC ...... G06F 3/0485; G06F 3/048; G06F 3/0481; G06F 3/04855
See application file for complete search history.

(56) References Cited

U.S. PATENT DOCUMENTS 5,060,170 A 10/1991 Bourgeois
5,615,320 A * 3/1997 Lavendel .............. G06T 11/001
345/593

(Continued)

OTHER PUBLICATIONS

United States Patent and Trademark Office, Notice of Allowance for U.S. Appl. No. 13/693,564, dated Jan. 20, 2016, pp. 1-24, Alexandria, VA, USA.

(Continued)

*Primary Examiner* — Kieu D Vu
*Assistant Examiner* — Andrew Chung
(74) *Attorney, Agent, or Firm* — Christopher M. Pignato (57) ABSTRACT

Nesting information indicative of a nested arrangement of a set of scrollable areas within an environment is obtained. Focus information indicative of which of the set of scrollable areas is in focus within the environment is obtained. A visualization scheme is applied to each of the set of scrollable areas other than the scrollable area in focus. The visualization scheme adjusts at least one display property of each other scrollable area by each of a function of a relative position of each other scrollable area relative to the scrollable area in focus within the nested arrangement and a function of a relative distance of each other scrollable area from the scrollable area in focus.

18 Claims, 2 Drawing Sheets

Related U.S. Application Data continuation of application No. 13/693,564, filed on Dec. 4, 2012, now Pat. No. 9,323,440.

(51) Int. Cl.
*G06F 3/048* (2013.01)
*G06F 3/0481* (2013.01)

(56) References Cited

U.S. PATENT DOCUMENTS

| | | | |
|---|---|---|---|
| 5,805,161 A | 9/1998 | Tiphane | |
| 5,874,961 A | 2/1999 | Bates | |
| 5,877,760 A | 3/1999 | Onda | |
| 5,898,433 A * | 4/1999 | Hijikata | G09G 5/14 715/782 |
| 5,903,267 A | 5/1999 | Fisher | |
| 5,920,313 A | 7/1999 | Diedrichsen | |
| 5,943,051 A | 8/1999 | Onda | |
| 5,999,176 A | 12/1999 | Kamper | |
| 6,020,887 A | 2/2000 | Loring | |
| 6,031,989 A | 2/2000 | Cordell | |
| 6,141,007 A | 10/2000 | Lebling | |
| 6,295,049 B1 | 9/2001 | Minner | |
| 6,353,451 B1 * | 3/2002 | Teibel | G06F 3/0481 715/764 |
| 6,421,071 B1 | 7/2002 | Harrison | |
| 6,445,400 B1 * | 9/2002 | Maddalozzo, Jr. | G06F 3/0481 715/781 |
| 6,912,694 B1 | 6/2005 | Harrison | |
| 7,114,129 B2 | 9/2006 | Awada | |
| 7,320,105 B1 | 1/2008 | Sinyak | |
| 7,362,311 B2 | 4/2008 | Filner | |
| 7,428,709 B2 | 9/2008 | Forstall | |
| 7,487,444 B2 | 2/2009 | Lira | |
| 7,487,462 B2 | 2/2009 | Good | |
| 7,574,669 B1 * | 8/2009 | Braun | G06F 3/0483 715/776 |
| 8,156,494 B2 | 4/2012 | Zhou | |
| 8,510,647 B2 | 8/2013 | Madden | |
| 8,515,831 B2 | 8/2013 | Vatti | |
| 8,650,473 B2 | 2/2014 | Fukasawa | |
| 8,924,865 B1 | 12/2014 | Tiwari | |
| 9,032,327 B2 | 5/2015 | Williams | |
| 9,213,714 B1 * | 12/2015 | Ording | G06F 3/0481 |
| 9,323,440 B2 | 4/2016 | Borkowski | |
| 2001/0011364 A1 | 8/2001 | Stoub | |
| 2001/0030662 A1 * | 10/2001 | Ohkawa | G06F 3/0481 715/764 |
| 2002/0191028 A1 | 12/2002 | Senechalle | |
| 2003/0058281 A1 | 3/2003 | Kepros | |
| 2003/0077003 A1 * | 4/2003 | Ma | G06T 3/4007 382/299 |
| 2003/0115167 A1 | 6/2003 | Sharif | |
| 2003/0156124 A1 | 8/2003 | Good | |
| 2004/0205594 A1 | 10/2004 | Arora | |
| 2005/0091604 A1 | 4/2005 | Davis | |
| 2005/0210404 A1 | 9/2005 | Hakiel | |
| 2006/0059436 A1 | 3/2006 | Nurmi | |
| 2006/0174212 A1 | 8/2006 | Cok | |
| 2006/0174214 A1 | 8/2006 | McKee | |
| 2006/0200764 A1 | 9/2006 | Sellers | |
| 2006/0236261 A1 | 10/2006 | Forstall | |
| 2006/0277488 A1 | 12/2006 | Cok | |
| 2007/0011622 A1 * | 1/2007 | Chae | G06F 16/1734 715/764 |
| 2007/0092243 A1 | 4/2007 | Allen | |
| 2008/0016462 A1 | 1/2008 | Wyler | |
| 2008/0046816 A1 | 2/2008 | Cao | |
| 2008/0098327 A1 * | 4/2008 | Berkovitz | G06F 3/0481 715/803 |
| 2009/0150822 A1 | 6/2009 | Miller | |
| 2010/0122042 A1 * | 5/2010 | Lin | G09G 5/003 711/154 |
| 2010/0164895 A1 | 7/2010 | Kim | |
| 2011/0093809 A1 | 4/2011 | Colby | |
| 2011/0181524 A1 * | 7/2011 | Hinckley | G06F 3/04883 345/173 |
| 2011/0246923 A1 * | 10/2011 | Kasahara | G06F 3/04855 715/771 |
| 2011/0246934 A1 * | 10/2011 | Nakagawa | B60K 37/06 715/802 |
| 2012/0005623 A1 | 1/2012 | Ishak | |
| 2012/0044256 A1 * | 2/2012 | Ide | G06F 16/904 345/619 |
| 2012/0089938 A1 * | 4/2012 | Homma | G06F 3/0486 715/776 |
| 2012/0167015 A1 * | 6/2012 | Martick | G06T 19/00 715/853 |
| 2012/0233562 A1 * | 9/2012 | Rodgers | G06T 11/206 715/768 |
| 2012/0246593 A1 | 9/2012 | Rauenzahn | |
| 2012/0288139 A1 * | 11/2012 | Singhar | G06F 1/3265 382/103 |
| 2013/0339907 A1 | 12/2013 | Matas | |
| 2014/0108981 A1 | 4/2014 | Payzer | |
| 2016/0210010 A1 | 7/2016 | Borkowski | |

OTHER PUBLICATIONS

United States Patent and Trademark Office, Office Action for U.S. Appl. No. 13/693,564, dated Sep. 23, 2014, pp. 1-13, Alexandria, VA, USA.

United States Patent and Trademark Office, Office Action for U.S. Appl. No. 13/693,564, dated Jun. 29, 2015, pp. 1-20, Alexandria, VA, USA.

Apostolos Antonacopoulos, et al., Web Document Analysis: Challenges and Opportunities, Chapter 5: Reflowable Document Images, Jan. 2003, pp. 1-15.

Author Unknown, Comparing the Same Workbook: View Multiple Sheets of an Excel Workbook, Archived Webpage, Feb. 17, 2006, pp. 1-2, Published online at: http://www.ozgrid.com/Excel/comparing-same-workbook.him.

Author Unknown, Frames in HTML Documents, Archived webpage, Aug. 16, 2000, pp. 1-10, Published online at: http://www.w3.org/TR/html4/present/framed.html.

Author Unknown, Reflow the contents of Adobe PDF documents, Adobe Acrobat 5.0, Apr. 2001, pp. 1-3, Adobe Systems Inc.

Author Unknown, Scroll 2 divs with one scrollbar, Dynamic Drives Forum, Apr. 2011, pp. 1-2, Jelsoft Enterprises Ltd., Published online at: http://www.dynamicdrive.com/forums/archive/index.php/t-9758.html.

Author Unknown, Scrolling textareas in sync with Firefox, Jul. 2005, pp. 1-5, Bytes, Published online at: http:/fwww_bytes.com/topic/javascript/answers/151053-scrolling-textareas-sync-firefox.

Author Unknown, Using Accessible PDF Documents with Adobe Reader 7.0: A Guide for People with Disabilities, Archived webpage, 2005, pp. 1-74, Adobe Systems, Inc., Published online at: http://www.adobe.com/enterprise/accessibility/reader/pdfs/reader7_accessibility.pdf.

Dan Gookin, Word 2007 for Dummies, Dec. 2006, pp. 1-5, John Wiley & Sons, Inc., Published online at: http://www_dummies.com/store/product/Word-2007-For-Dummies.productCd-0470036583.html.

Diane Koers, Microsoft Word 2003 Fast & Easy, Oct. 2003, pp. 1-3 (citing p. 72), Course Technology PTR.

Edward W. Ishak, et al., Content-Aware Scrolling, In Proceedings of UIST'06, Oct. 2006, pp. 1-4, Association for Computing Machinery, Montreux, Switzerland.

Mohammad Al-Ubaydli, et al., The Doctor's PDS and Smartphone Handbook: Medical references, Journal of the Royal Society of Medicine, Mar. 2006, vol. 99, pp. 120-124.

S. Scott Zimmerman, et al., New Perspectives on Microsoft Office Word 2007, Aug. 2007, pp. 1-3, Course Technology.

United States Patent and Trademark Office, Notice of Allowance for U.S. Appl. No. 11/950,678, dated Feb. 19, 2014, pp. 1-13, Alexandria, VA, USA.

(56) References Cited

OTHER PUBLICATIONS

United States Patent and Trademark Office, Office Action for U.S. Appl. No. 11/950,678, dated Mar. 31, 2011, pp. 1-19, Alexandria, VA, USA.
United States Patent and Trademark Office, Office Action for U.S. Appl. No. 11/950,678, dated May 17, 2013, pp. 1-21, Alexandria, VA, USA.
United States Patent and Trademark Office, Office Action for U.S. Appl. No. 11/950,678, dated Nov. 6, 2013, pp. 1-31, Alexandria, VA, USA.
United States Patent and Trademark Office, Office Action for U.S. Appl. No. 11/950,678, dated Sep. 27, 2011, pp. 1-19, Alexandria, VA, USA.
Appendix P—List of IBM Patents or Patent Applications Treated as Related, Filed herewith, 2 Pages.

* cited by examiner

SCROLL FOCUS

BACKGROUND

The present disclosure is an invention disclosure relating to a method of indicating focus in an environment comprising scrollable areas in nested arrangement, a system for indicating focus as well as a corresponding computer program product.

Graphical user interfaces employ scrollable areas that allow a larger amount of information to be presented than may be presented at one time within the viewable area. One (child) scrollable area may be nested within another (parent) scrollable area. Indeed, one (child) scrollable area may be nested within another (parent) scrollable area that is nested within another (grandparent) scrollable area, etc. Moreover, two or more (sibling) scrollable areas may be nested within another (parent) scrollable area, where the two or more (sibling) scrollable areas are in non-nested relationship. In other words, the scrollable areas may be nested in a hierarchical fashion that may include parent-child (also called "vertical") relationships as well as sibling (also called "horizontal") relationships.

In such graphical user interfaces, only one of the scrollable areas is "in focus" at a given time. In other words, a scrolling action only acts upon one of the scrolling areas at a time. The active scrolling area is designated as being "in focus" since that scrolling area is the "focus" of the user's attention.

SUMMARY

A method includes obtaining nesting information indicative of a nested arrangement of a plurality of scrollable areas within an environment; obtaining focus information indicative of which of the plurality of scrollable areas is in focus within the environment; and applying a visualization scheme to each of the plurality of scrollable areas other than the scrollable area in focus, where the visualization scheme increasingly adjusts at least one display property of each other scrollable area by each of a function of a relative position of each other scrollable area relative to the scrollable area in focus within the nested arrangement and a function of a relative distance of each other scrollable area from the scrollable area in focus.

A system includes a display and a processor programmed to: obtain nesting information indicative of a nested arrangement of a plurality of scrollable areas within an environment; obtain focus information indicative of which of the plurality of scrollable areas is in focus within the environment; and apply a visualization scheme to each of the plurality of scrollable areas other than the scrollable area in focus, where the visualization scheme increasingly adjusts at least one display property on the display of each other scrollable area by each of a function of a relative position of each other scrollable area relative to the scrollable area in focus within the nested arrangement and a function of a relative distance of each other scrollable area from the scrollable area in focus.

A computer program product includes a computer readable storage medium having computer readable program code embodied therewith, where the computer readable program code when executed on a computer causes the computer to: obtain nesting information indicative of a nested arrangement of a plurality of scrollable areas within an environment; obtain focus information indicative of which of the plurality of scrollable areas is in focus within the environment; and apply a visualization scheme to each of the plurality of scrollable areas other than the scrollable area in focus, where the visualization scheme increasingly adjusts at least one display property of each other scrollable area by each of a function of a relative position of each other scrollable area relative to the scrollable area in focus within the nested arrangement and a function of a relative distance of each other scrollable area from the scrollable area in focus.

DETAILED DESCRIPTION

The present technology provides for indicating focus within a plurality/set of nested scrollable areas. The present technology facilitates setting display properties of one or more of the scrollable areas in accordance with a visualization scheme representative of the scrollable area in focus and/or the hierarchical relationship of the nested scrollable areas (relative to the scrollable area in focus). For example, the present technology may include setting the display properties of a portion of the scrollbars of the scrollable areas such that the scrollbar portions are displayed with differing colors, the colors not only indicating which of the scrollable areas is in focus, but also indicating the hierarchical relationship of the other scrollable areas to the scrollable area in focus. For additional example, the scrollable area in focus may be given a red scrollbar, with "adjacent" (e.g., parent/offspring) scrollable areas in a vertical direction of the nesting hierarchy being given an orange scrollbar and more distant scrollable areas in a vertical direction of the nesting hierarchy being given a yellow scrollbar, the yellow becoming increasingly paler with increasing hierarchical distance from the scrollable area in focus. Similarly, scrollable areas in a horizontal direction of the nesting hierarchy relative to the scrollable area in focus may be given gray scrollbars, where the darkness of gray decreases with increasing distance from the scrollable area in focus. Other visualization schemes are also possible.

In one aspect, the present disclosure relates to technology for indicating focus, such as within an environment including (a plurality/set of) scrollable areas in nested arrangement. The environment may be a computing environment, a graphical user interface, and/or a display environment. One or more or all of the scrollable areas may be windows of a graphical user interface.

A scrollable area may be understood as a region having content (e.g., text and/or graphics) that may be scrolled relative to the region, such as in a vertical (e.g., up and down) and/or horizontal (e.g., left and right) direction. For example, the content may be scrolled relative to the region such that a visible portion of the (total) content (e.g., the portion that is visible within the region) changes in accordance with the direction and amount of scrolling. In this respect, the scrollable area may include a scrollbar, such as an element that indicates a relationship of the visible portion of the content to the total content. The scrollbar may include a scrollbar elevator (e.g., a thumb, puck, grip, knob, wiper. etc.). The scrollbar may include a scrollbar track (also known as a trough). The environment may represent the elevator and the track such that the elevator appears to slide along the track between two bounding ends of the tracks as the user scrolls. The scrollbar need not always be displayed. In other words, the environment may present the scrollbar only when given conditions are met.

Additionally, a scrollable area may be understood not only in the sense of a conceptual and/or visible region (e.g., a conceptual and/or at least partly visible region on a display of the computing/display environment or a conceptual and/or at least partly visible region of the graphical user interface), but may also be understood in the sense of data that is representative of the scrollable area and/or the content of the scrollable area. The data may be representative of display properties that stipulate how the scrollable area and/or its content is to be displayed. For example, the data may define any of the size, location, and/or color of the scrollable area; the font, font size, and/or color of textual content of the scrollable area; the style, location, and/or color of a scrollbar of the scrollable area, etc. The display properties may also include filling patterns and/or graphical effects such as shadowing and blur. The display properties may also include one or more of a shading property of a scrollbar elevator, a color property of a scrollbar elevator, a shading property of a scrollbar track, and a color property of a scrollbar track.

In the context of the present description, the expression "scrollable areas in nested arrangement" may be understood in the sense that each of the scrollable areas except one (e.g., excepting the scrollable area highest in a nesting hierarchy) is nested within any other respective one of the scrollable areas. In other words, each of the scrollable areas except one may belong to the content of any other respective one of the scrollable areas. In other words, one of the scrollable areas (e.g., the scrollable area highest in a nesting hierarchy) may have content that includes a set of any others of the scrollable areas. Each scrollable area in the set may have content that includes a (child) set of any others of the remaining scrollable areas. Each scrollable area in such a (child) set may have content that includes a ((grand)child) set of any others of the remaining scrollable areas. This relationship scheme may continue iteratively until all of the scrollable areas have been associated with the content of a respective (parent) scrollable area. In such a nested arrangement, two or more (sibling) scrollable areas may belong to the content of the same (parent) scrollable area. A scrollable area that belongs to the content of another scrollable area moves with the content of the other scrollable area when the content of the other scrollable area is scrolled.

A scrollable area having content that includes another scrollable area may be termed a "parent" relative to the other scrollable area. In turn, the other scrollable area may be termed a "child" relative to the (parent) scrollable area. Such a parent-child/child-parent relationship between scrollable areas may be termed a "vertical" relationship. Such parent-child relationships may extend over multiple levels of hierarchy. In other words, as limited only by the total number of scrollable areas, any "child" scrollable area may have any number of "ancestor" (i.e. parent, grandparent, great-grandparent, etc.) generations.

Each of two or more scrollable areas belonging to the content of the same (parent) scrollable area may be termed "siblings" relative to others of the two or more scrollable areas. Such a sibling relationship between scrollable areas may be termed a "horizontal" relationship.

The present technology may include obtaining nesting information indicative of the nested arrangement. The nesting information may include, for one or more or each of the scrollable areas, information indicative of any parent-child/child-parent relationships and/or any sibling relationships pertaining to the respective scrollable area. For example, the nesting information may be representative of a tree structure representative of the nested arrangement.

The term "obtaining" may include establishing the respective information based on other data and/or measurements. Similarly, the term "obtaining" may include receiving the respective information from a storage medium, via a computer network, and/or by user input. In the present description, any "obtaining" may be accompanied by a "storing" of the established/received information (e.g., in a computer memory, on a hard disk, in a flash storage device, or in any other storage device).

The present technology may further include obtaining focus information indicative of which of the scrollable areas is in focus. In the present disclosure, the expression "to be in focus" may be understood in the sense that a current action (e.g., a user action or an automated action) is performed with regard to the scrollable area(s) in focus. In other words, "focus" may indicate the component (of the environment) that is currently selected to receive input. For example, text input by a user may appear in a scrollable area in focus. Similarly, a scrolling action may cause the content of a scrollable area in focus to scroll accordingly. In contrast to conventional graphical user interfaces and computing/display environments that allow only one scrollable area to be in focus at any given time, the present technology does not require that only one scrollable area be in focus at any given time or that a scrollable area be currently visible to be in focus.

The present technology may include altering, for one or more or all of the scrollable areas, at least one display property of the respective scrollable area. The respective altering may be carried out based on the nesting information and/or the focus information.

As described above, the scrollable area may include data representative of display properties that stipulate how the scrollable area and/or its content are to be displayed. For example, the data may define any of the size, location, and/or color of the scrollable area; the font, font size, and/or color of textual content of the scrollable area; the style, location, and/or color of a scrollbar of the scrollable area, etc.

One or more of the display properties may be altered based on the focus information. For example, the color of the scrollable area in focus or the color of a scrollbar of the scrollable area in focus may be set to a given color. Similarly, the width of a scrollbar of the scrollable area in focus may be set to a given width.

One or more of the display properties may be altered based on the nesting information. For example, the color of each of the scrollable areas may be set to a given hue, the lightness and/or saturation of the respective color of each of the scrollable areas being set as a function of a "distance" of the respective scrollable area from the highest most scrollable area in the nesting hierarchy. Similarly, one or more of the display properties may be altered as a function of a "distance" of the respective scrollable area from a given scrollable area in the nesting hierarchy (e.g., as a function of the "distance" in a vertical and/or horizontal direction of the nesting hierarchy) of the respective scroll area from the scroll area in focus.

The aforementioned altering may be performed in accordance with a visualization scheme. The visualization scheme may visually convey the nesting information and/or the focus information, at least in part, to a user when scrollable areas whose display properties have been altered in accordance with the visualization scheme are displayed to the user. The visualization scheme may be representative of the nesting arrangement relative to the scrollable area in focus. For example, the visualization scheme may stipulate that the color of each of the scrollable areas be set to a given hue, the lightness and/or saturation of the respective color of each of the scrollable areas being set as a function of the "distance" of the respective scrollable area from the scrollable area in focus. Similarly, the visualization scheme may stipulate that the display properties of each of the scrollable areas are set such that the content or the scrollbars of the scrollable areas appear blurred as a function of the "distance" of the respective scrollable area from the scrollable area in focus, with the scrollable area in focus having no blur and "distant" scrollable areas being increasingly blurred.

The visualization scheme may depend on the total number of scrollable areas and/or on the number of visible scrollable areas, such as visible in the environment or on a given display of the environment. The visualization scheme may include a plurality/set of (mutually different) sub-schemes. For example, the visualization scheme may include a visualization sub-scheme for visually conveying nesting information as pertains to a vertical direction of the nesting hierarchy. Similarly, the visualization scheme may include a visualization sub-scheme for visually conveying nesting information as pertains to a horizontal direction of the nesting hierarchy. The visualization scheme may likewise include a visualization sub-scheme for visually conveying focus information.

The visualization scheme may include a (first) sub-scheme representative of parent-child relationships within the nesting arrangement relative to the scrollable area in focus. For example, the visualization scheme may stipulate that, for a plurality of scrollable areas having a vertical hierarchical relationship to one another, the color of a scrollbar of the respective scrollable area be set to a respective hue as a function of the "distance," in a vertical direction of the nesting hierarchy, of the respective scrollable area from the scrollable area in focus. For additional example, the scrollbar of the scrollable area in focus may be colored red, "adjacent" (parent and child) scrollable areas in a vertical direction of the nesting hierarchy may be given an orange scrollbar and more distant scrollable areas in a vertical direction of the nesting hierarchy may be given a yellow scrollbar, the yellow becoming increasingly paler with increasing hierarchical distance from the scrollable area in focus.

The visualization scheme may include a (second) sub-scheme representative of sibling relationships within the nesting arrangement relative to the scrollable area in focus. For example, the visualization scheme may stipulate that, for a plurality of scrollable areas having a horizontal hierarchical relationship to one another, the color of a scrollbar of the respective scrollable area be set to a respective brightness as a function of the "distance," in a horizontal direction of the nesting hierarchy, of the respective scrollable area from the scrollable area in focus. For example, the scrollbar of the scrollable area in focus may be colored red, "adjacent" scrollable areas in a horizontal direction of the nesting hierarchy may be given a light red scrollbar and more distant scrollable areas in a horizontal direction of the nesting hierarchy may be given a pale red scrollbar, the red becoming increasingly paler with increasing hierarchical/horizontal distance from the scrollable area in focus. Adjacency in a horizontal direction of the nesting hierarchy may be based on the (displayed) position of the respective sibling scrollable areas relative to each other and to other sibling scrollable areas in the parent scrollable area. In other words, sibling scrollable areas may be considered "adjacent" in a horizontal direction of the nesting hierarchy if there are no intermediate sibling scrollable areas when the "adjacent" scrollable areas are displayed in the parent scrollable area. The second sub-scheme may differ from the first sub-scheme.

The present technology may include receiving a change-of-focus instruction, (e.g., an instruction such as from a user) specifying that a change in focus is desired. The change-of-focus instruction may be a navigation instruction, (e.g., an instruction from a user) specifying a desired change in focus from one scrollable area to another scrollable area in an up, down, left, or right direction within the nesting hierarchy. Similarly, the navigation instruction may be an instruction specifying a desired change in focus to a given scrollable area (e.g., to the scrollable area highest in the nesting hierarchy). The change-of-focus instruction may be received via a user input device and/or via a graphical user interface of the environment. For example, on a double-button mouse having a scroll wheel, scrolling the scroll wheel may cause a scrolling through the content of the scrollable area in focus, whereas a scrolling of the scroll wheel while the left or right button is depressed may cause a change of focus in a horizontal direction of the nesting hierarchy (e.g., a change of focus among sibling scrollable areas), and a scrolling of the scroll wheel while the other of the left or right button is depressed may cause a change of focus in a vertical direction of the nesting hierarchy (e.g., a change of focus among parent/child scrollable areas). In this respect, the environment may comprise a double-button mouse having a scroll wheel. Similarly, where the present teachings are embodied as a system, the system may include technology for processing inputs from a double-button mouse having a scroll wheel.

The present technology may include altering, such as in response to a change-of-focus instruction, which of the scrollable areas is in focus based on the nesting information and/or the navigation instruction. For example, in response to a change-of-focus instruction, the focus may change in a given manner from one scrollable area to another scrollable area. For instance, a user may specify, as the given manner, that the focus is to change to the parent scrollable area of the scrollable area currently in focus in response to a change-of-focus instruction. Similarly, a user may specify, as the given manner, that the focus is to change to the scrollable area adjacent to and to the left of the scrollable area currently in focus in response to a change-of-focus instruction. In another example, the focus may change in response to a navigation instruction in a direction specified by the navigation instruction with respect to the nesting hierarchy from one scrollable area to another scrollable area. For instance, a navigation instruction may specify that the focus is to change in a downward direction with respect to the nesting hierarchy. Where multiple scrollable areas lie in the direction designated by the given manner of the navigation instruction, the altering may be performed in accordance with a given rule (e.g., a rule that the focus changes to the leftmost, centermost, or rightmost scrollable area) in the designated direction. Similarly, the altering may be performed in accordance with a given rule when no scrollable areas lie in the designated direction (e.g., a rule that the focus be changed to the leftmost scrollable area in the bottommost level of hierarchy of the nesting hierarchy in response to an "up" instruction when the scrollable area highest in the nesting hierarchy is currently in focus or a rule that the focus be changed to the leftmost scrollable area in a respective level of hierarchy in response to a "right" instruction when the outermost right scrollable area of the respective level of hierarchy is currently in focus).

After an altering of which of the scrollable areas is in focus, one or more display properties of one or more of the scrollable areas may be altered, such as described above, with due regard for the change in focus.

The present technology may include obtaining, such as in response to a change in focus, updated focus information indicative of which of the scrollable areas is in focus. For example, a change in focus may be notified such that whenever a change in focus occurs or whenever a change in focus occurs that is not performed, the present technology may be triggered to obtain updated focus information. Such a change in focus may occur when a user clicks on a scrollable area that was not in focus.

The present technology may include altering, for one or more or all of the scrollable areas, at least one display property of the respective scrollable area based on the updated focus information. The altering based on updated focus information may be performed in a manner analogous to the altering described hereinabove.

The present technology may be implemented in the form of a method, a system for indicating focus in an environment comprising scrollable areas in nested arrangement, or a computer program product.

A system may be configured and adapted to perform any of the actions described above with respect to the disclosed method. The system may include a nesting information obtaining component that obtains nesting information as discussed hereinabove. The system may additionally/alternatively include a focus information obtaining component that obtains (updated) focus information as discussed hereinabove. The system may include a display property altering component that alters at least one display property of at least one scrollable area. The system may include a change-of-focus instruction receiving component that receives a navigation instruction. The system may include a focus altering component that alters which of the scrollable areas is in focus. Any of the aforementioned components of the system may communicate with any other of the aforementioned components of the system. In this respect, the system may include one or more communication busses/links interconnecting the respective components.

Figure 1:
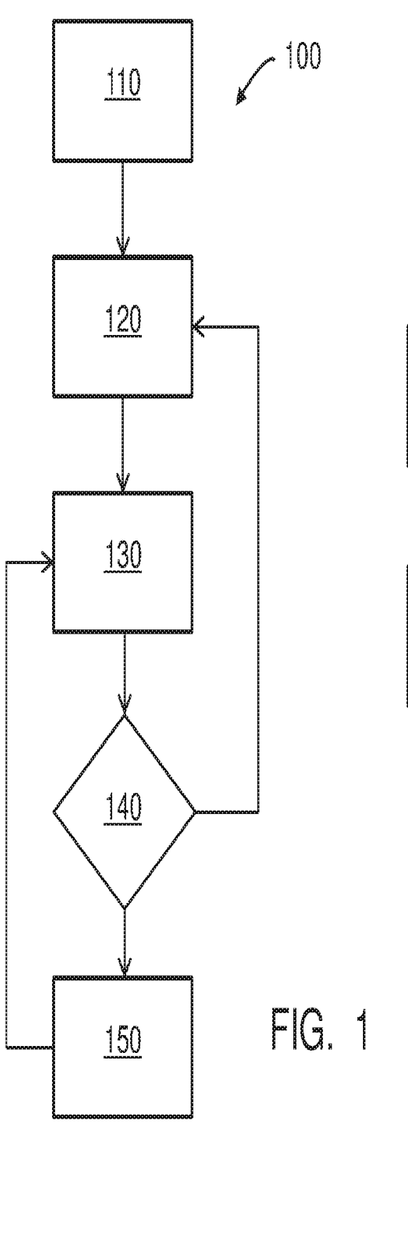
FIG. 1 schematically shows a flow diagram of an embodiment of a method of indicating focus in accordance with the present disclosure.

FIG. 1 schematically shows an example of an implementation of a flow diagram 100 for indicating focus in accordance with the present subject matter as described above.

In the illustrated embodiment, the flow diagram 100 includes a step 110 where nesting information is obtained; a step 120 where focus information is obtained; a step 130 where at least one display property of at least one scrollable area is altered; a step 140 where, per iteration, either a change-of-focus instruction is received or the method is notified of a change in focus; and a step 150 where the focus is altered. Any of these steps may be performed as described above. If, at step 140, a change-of-focus instruction is received, the method proceeds to step 150. If at step 140, the method is notified of a change in focus, the method proceeds to step 120 where updated focus information may be obtained.

Figure 2:
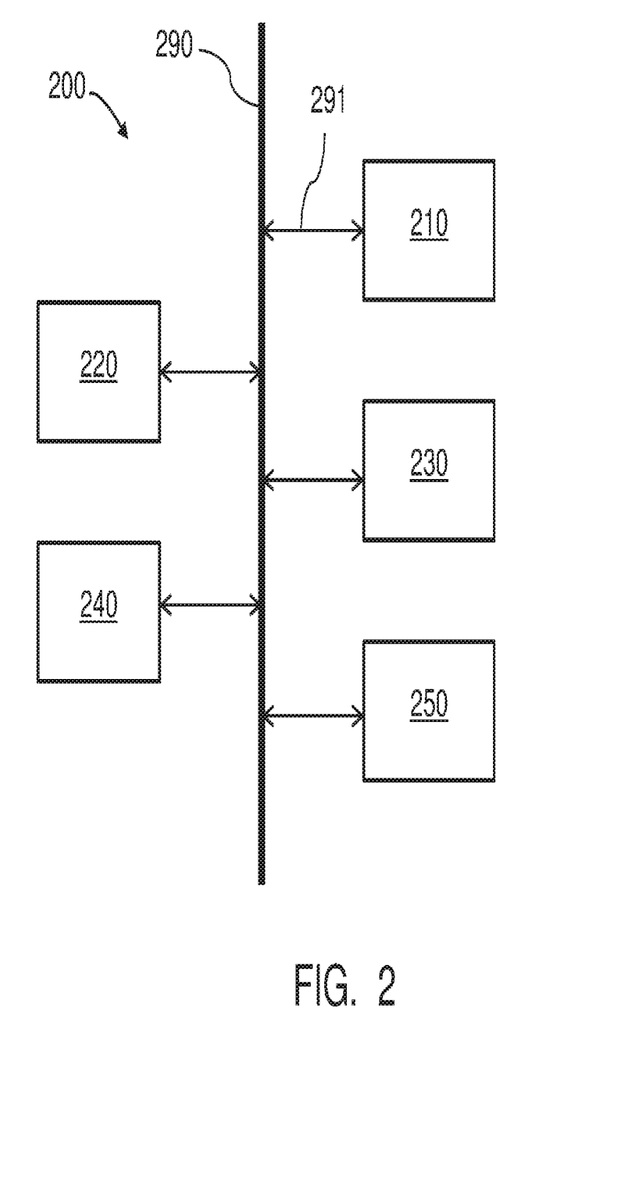
FIG. 2 schematically shows an embodiment of a system for indicating focus in accordance with the present disclosure.

FIG. 2 schematically shows an example of an implementation of a system 200 for indicating focus in accordance with the present subject matter as described above.

In the illustrated embodiment, the system 200 includes a nesting information obtaining component 210; a focus information obtaining component 220; a display property altering component 230; a change-of-focus instruction receiving component 240; a focus altering component 250; and a communication bus 290 including a plurality/set of communication links 291 (for the sake of legibility, only one of the communication links bears a reference designator). Communication bus 290 and the communication links 291 communicatively interconnect the aforementioned components 210-250.

Figure 3:
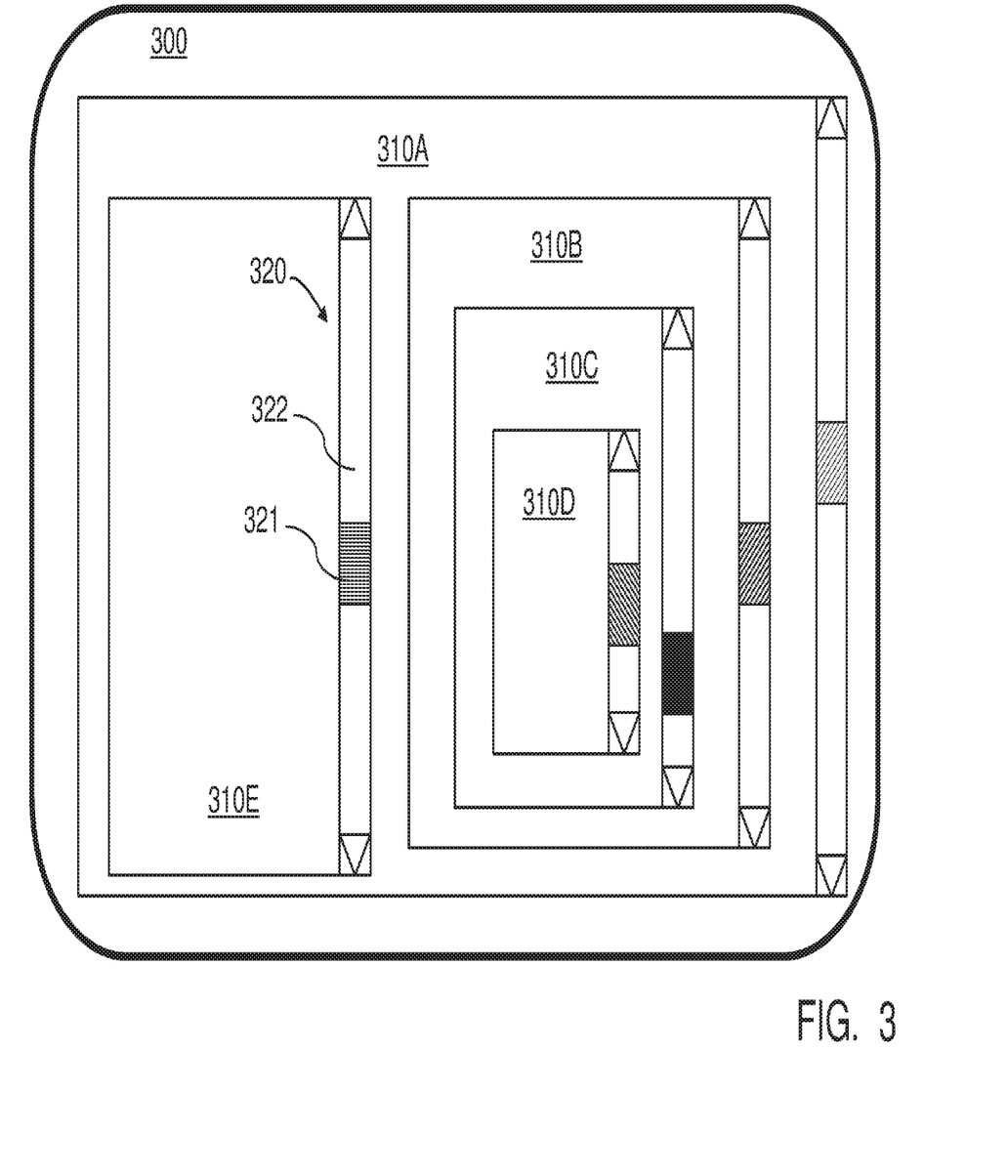
FIG. 3 schematically shows an embodiment of an environment comprising scrollable areas in nested arrangement in accordance with the present disclosure.

FIG. 3 schematically shows an example of an implementation of an environment 300 including scrollable areas in nested arrangement in accordance with the present subject matter as described above.

In the illustrated embodiment, the environment 300 includes a plurality/set of scrollable areas 310A-310E, each having a scrollbar 320 (for the sake of legibility, only the scrollbar of scrollable area 310E bears reference designator). Each of the scrollbars 320 has a scrollbar elevator 321 as well as a scrollbar track 322.

In the illustrated embodiment, the scrollable area 310C is in focus. In the illustrated visualization scheme, this is represented by the blackness of its scrollbar elevator 321.

The scrollbar elevator 321 of the scrollable area 310B is less dark, indicating that the scrollable area 310B is at a different level of hierarchy than the scrollable area 310C in the nesting arrangement. The pattern of the scrollbar elevator 321 of scrollable area 310B moreover indicates that scrollable area 310B is a predecessor in the same line of hierarchy as the scrollable area 310C (e.g., that the scrollable area 310B is the parent of scrollable area 310C).

The scrollbar elevator 321 of the scrollable area 310D is equally less dark, indicating that the scrollable area 310D is at a similarly "distant" level of hierarchy from the scrollable area 310C in the nesting arrangement as the scrollable area 310B. The pattern of the scrollbar elevator 321 of scrollable area 310D moreover indicates that scrollable area 310D is a successor in the same line of hierarchy as scrollable area 310C (e.g., that the scrollable area 310D is a child of scrollable area 310C).

The scrollbar elevator 321 of the scrollable area 310A is least dark, indicating that the scrollable area 310A is at a most "distant" level of hierarchy from the scrollable area 310C in the nesting arrangement. The pattern of the scrollbar elevator 321 of the scrollable area 310A moreover indicates that the scrollable area 310A is a predecessor in the same line of hierarchy as the scrollable area 310C (e.g., that the scrollable area 310A is the grandparent of scrollable area 310C).

The scrollbar elevator 321 of the scrollable area 310E is of the same shade as the scrollbar elevator 321 of the scrollable area 310B, indicating that the scrollable areas 310B and 310C are at the same level of hierarchy (e.g., are siblings) in the nesting arrangement. The pattern of the scrollbar elevator 321 of the scrollable area 310E moreover indicates that the scrollable area 310E is not in the same line of hierarchy as the scrollable area 310C.

It should be understood that other visualization schemes (e.g., color visualization schemes, patterns, shading, etc.) are possible that are not limited to black and white representations or the patterns represented within FIG. 3. A black and white visualization scheme has been chosen for the present example for the sake of better reproducibility of the figures. As such, the present technology is not limited to any particular pattern-based or color-base implementation.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the present disclosure, the verb "may" is used to designate optionality/noncompulsoriness. In other words, something that "may" can, but need not. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   nesting, by a processor, an arrangement of scrollable areas as a nested hierarchy within an environment;
   focusing, by the processor, on a first scrollable area within the arrangement of scrollable areas, wherein the first scrollable area is positioned highest in the nested hierarchy of the arrangement of scrollable areas; and
   applying, by the processor, a visualization scheme conveying nesting information, to the arrangement of scrollable areas, wherein the visualization scheme increasingly adjusts at least one display property of each scrollable area within the arrangement of scrollable areas as a function of a hierarchical position within the arrangement relative to the first scrollable area focused on within the arrangement and as a function of a relative distance of each of the scrollable areas to the first scrollable area in focus, wherein within the visualization scheme the at least one display property being increasingly adjusted matches between different scrollable areas within a same level of the nested hierarchy within the environment.

2. The method of claim 1, wherein the visualization scheme further comprises:
   applying, by the processor, a first visualization sub-scheme representative of parent-child relationships that increasingly adjust the at least one display property of each of the scrollable areas as a function of a position and distance vertically relative to the first scrollable area; and
   applying, by the processor, a second visualization sub-scheme representative of sibling relationships that increasingly adjust the at least one display property of each of the scrollable areas as a function of a position and distance horizontally relative to the first scrollable area.

3. The method of claim 2, wherein the at least one display property adjusted by the first visualization sub-scheme differs from the at least one display property adjusted by the second visualization sub-scheme.

4. The method of claim 1, further comprising:
   receiving, by the processor, a change-of-focus instruction that specifies a navigation direction within the arrangement scrollable areas;
   determining, by the processor, that a plurality of scrollable areas are within the navigation direction; and
   altering, by the processor, which scrollable area is in focus in accordance with a navigation focus change rule that specifies at least one of the plurality of scrollable areas to place in focus, and the navigation focus change rule allows wrapping focus to scrollable areas at an opposite edge of the arrangement of scrollable areas.

5. The method of claim 4, further comprising:
   receiving, by the processor, updated focus information indicating a second scrollable area within the arrangement of scrollable areas is currently in focus as a result of the change-of-focus; and
   applying, by the processor, the visualization scheme to the arrangement of scrollable areas by increasingly adjusting the at least one display property of each scrollable area within the arrangement of scrollable areas as a function of a position relative to the second scrollable area focused on within the arrangement and as a function of a relative distance of each of the scrollable areas to the second scrollable area in focus.

6. The method of claim 1, where the at least one display property is selected from the group consisting of a shading property of a scrollbar elevator, a color property of a scrollbar elevator, a shading property of a scrollbar track and a color property of a scrollbar track.

7. A computer system, comprising:
   a processor; and
   a computer-readable storage media coupled to the processor, wherein the computer-readable storage media contains program instructions executing a computer implemented method comprising:
      nesting, by the processor, an arrangement of scrollable areas as a nested hierarchy within an environment;
      focusing, by the processor, on a first scrollable area within the arrangement of scrollable areas, wherein the first scrollable area is positioned highest in the nested hierarchy of the arrangement of scrollable areas; and
      applying, by the processor, a visualization scheme conveying nesting information, to the arrangement of scrollable areas, wherein the visualization scheme increasingly adjusts at least one display property of each scrollable area within the arrangement of scrollable areas as a function of a hierarchical position within the arrangement relative to the first scrollable area focused on within the arrangement and as a function of a relative distance of each of the scrollable areas to the first scrollable area in focus, wherein within the visualization scheme the at least one display property being increasingly adjusted matches between different scrollable areas within a same level of the nested hierarchy within the environment.

8. The system of claim 7, where the visualization scheme further comprises:
   applying, by the processor, a first visualization sub-scheme representative of parent-child relationships that increasingly adjust the at least one display property of each of the scrollable areas as a function of a position and distance vertically relative to the first scrollable area; and
   applying, by the processor, a second visualization sub-scheme representative of sibling relationships that increasingly adjust the at least one display property of each of the scrollable areas as a function of a position and distance horizontally relative to the first scrollable area.

9. The system of claim 8, wherein the at least one display property adjusted by the first visualization sub-scheme differs from the at least one display property adjusted by the second visualization sub-scheme.

10. The system of claim 7, further comprising:
receiving, by the processor, a change-of-focus instruction that specifies a navigation direction within the arrangement scrollable areas;
determining, by the processor, that a plurality of scrollable areas are within the navigation direction; and
altering, by the processor, which scrollable area is in focus in accordance with a navigation focus change rule that specifies at least one of the plurality of scrollable areas to place in focus, and the navigation focus change rule allows wrapping focus to scrollable areas at an opposite edge of the arrangement of scrollable areas.

11. The system of claim 10, further comprising:
receiving, by the processor, updated focus information indicating a second scrollable area within the arrangement of scrollable areas is currently in focus as a result of the change-of-focus; and
applying, by the processor, the visualization scheme to the arrangement of scrollable areas by increasingly adjusting the at least one display property of each scrollable area within the arrangement of scrollable areas as a function of a position relative to the second scrollable area focused on within the arrangement and as a function of a relative distance of each of the scrollable areas to the second scrollable area in focus.

12. The system of claim 7, where the at least one display property is selected from the group consisting of a shading property of a scrollbar elevator, a color property of a scrollbar elevator, a shading property of a scrollbar track and a color property of a scrollbar track.

13. A computer program product, comprising:
one or more computer-readable storage media having computer-readable program instructions stored on the one or more computer-readable storage media said program instructions executes a computer-implemented method comprising:
nesting an arrangement of scrollable areas as a nested hierarchy within an environment;
focusing on a first scrollable area within the arrangement of scrollable areas, wherein the first scrollable area is positioned highest in the nested hierarchy of the arrangement of scrollable areas; and
applying a visualization scheme conveying nesting information, to the arrangement of scrollable areas, wherein the visualization scheme increasingly adjusts at least one display property of each scrollable area within the arrangement of scrollable areas as a function of a hierarchical position within the arrangement relative to the first scrollable area focused on within the arrangement and as a function of a relative distance of each of the scrollable areas to the first scrollable area in focus, wherein within the visualization scheme the at least one display property being increasingly adjusted matches between different scrollable areas within a same level of the nested hierarchy within the environment.

14. The computer program product of claim 13, wherein the visualization scheme further comprises:
applying a first visualization sub-scheme representative of parent-child relationships that increasingly adjust the at least one display property of each of the scrollable areas as a function of a position and distance vertically relative to the first scrollable area; and
applying a second visualization sub-scheme representative of sibling relationships that increasingly adjust the at least one display property of each of the scrollable areas as a function of a position and distance horizontally relative to the first scrollable area.

15. The computer program product of claim 14, wherein the at least one display property adjusted by the first visualization sub-scheme differs from the at least one display property adjusted by the second visualization sub-scheme.

16. The computer program product of claim 13, further comprising:
receiving a change-of-focus instruction that specifies a navigation direction within the arrangement scrollable areas;
determining that a plurality of scrollable areas are within the navigation direction; and
altering which scrollable area is in focus in accordance with a navigation focus change rule that specifies at least one of the plurality of scrollable areas to place in focus, and the navigation focus change rule allows wrapping focus to scrollable areas at an opposite edge of the arrangement of scrollable areas.

17. The computer program product of claim 16, further comprising:
receiving updated focus information indicating a second scrollable area within the arrangement of scrollable areas is currently in focus as a result of the change-of-focus; and
applying the visualization scheme to the arrangement of scrollable areas by increasingly adjusting the at least one display property of each scrollable area within the arrangement of scrollable areas as a function of a position relative to the second scrollable area focused on within the arrangement and as a function of a relative distance of each of the scrollable areas to the second scrollable area in focus.

18. The computer program product of claim 13, where the at least one display property is selected from the group consisting of a shading property of a scrollbar elevator, a color property of a scrollbar elevator, a shading property of a scrollbar track and a color property of a scrollbar track.

* * * * *